United States Patent [19]

Mawyer et al.

[11] Patent Number: 4,489,377
[45] Date of Patent: Dec. 18, 1984

[54] METHOD FOR PREVENTING MACHINE COMPONENT INTERFERENCE

[75] Inventors: Helene B. N. Mawyer, Troy; Derek S. Welch, Crozet, both of Va.

[73] Assignee: General Electric Company, Charlottesville, Va.

[21] Appl. No.: 415,093

[22] Filed: Sep. 7, 1982

[51] Int. Cl.³ .............................................. G05B 23/02
[52] U.S. Cl. ..................................... 364/167; 364/171; 364/184; 364/474; 364/475; 318/565
[58] Field of Search ............... 364/167, 168, 169, 170, 364/171, 184, 186, 474, 475; 318/563, 565, 566, 626

[56] References Cited

U.S. PATENT DOCUMENTS 4,131,836 12/1978 Noda .................................... 364/474

OTHER PUBLICATIONS

General Numerics Publication B52242EZ/02, p. 10.
General Numerics Booklet GN 6T, Model B Controller, p. 36.
Mazak, Operating Manual for Mazatrol T-1, p. 6-4.

*Primary Examiner*—Jerry Smith
*Assistant Examiner*—Allen MacDonald
*Attorney, Agent, or Firm*—Ormand R. Austin

[57] ABSTRACT

A method for preventing interference between relatively moveable components of a computer controlled industrial machine in which the position of the moveable machine elements are controlled by a computer program. For each movement, the computer first determines a predicted path for the movement and thereafter determines whether the path will intersect a safe zone, a safe zone being defined as a zone containing an element which is to be protected from contact with the moveable element. If a predicted path intersects a safe zone, the machine operation is halted. Provision is made for manual moves, i.e., movements not directed by the computer up to the nearest intersection point with a safe zone.

5 Claims, 9 Drawing Figures

METHOD FOR PREVENTING MACHINE COMPONENT INTERFERENCE

Reference is made to a microfiche appendix forming a part of this application comprising two microfiche containing 72 frames.

The present invention relates generally to computer numerical control for industrial machines and, more particularly, to a method of establishing protected or safe zones within a machine's sphere of operation and inhibiting operation of the machine when a predicted movement will intersect a protected zone.

Computer numerical controls (CNC) when applied to industrial machines permit the automation of manufacturing processes with a minimum of human intervention. Because of the lack of human observation of the process on a full time basis, there exists the possibility that a movement of a cutting tool on a machine tool or an arm mechanism on an industrial robot may result in the tool or associated tool holding mechanism or robot arm being driven into a part of the machine itself or some other stationary object. For example, in a lathe in which a part being machined, i.e., the workpiece, is held in place by the jaws of a chuck, driving the cutting tool to the end of the workpiece may force the tool into contact with the jaws of the chuck resulting either in damage to the chuck or in breakage of the cutting tool. A similar problem may exist in a milling machine in which a workpiece is held in place on a workbed by a plurality of clamps. Relative movement between the milling machine cutting tool and the machine bed on which the workpiece is held may result in the cutting tool contacting the clamps and cause damage to either the clamps or the cutting tool. A similar problem exists for robot arm movements since point-to-point movements may follow a vectorial path into which other objects may have been placed.

With machine tools, one of the reasons for the possibility that a cutting tool or other portion of a machine may hit a clamp or a chuck face is that a part program for machining a workpiece is normally written by a computer programmer, or part programmer, who writes a part program based upon a mechanical drawing of the part which it is desired to machine. At the time that the part program is generated, the programmer may not know the exact location of any clamping devices or holding fixtures which the machine operator may utilize to hold the workpiece in position. Accordingly, a movement commanded by the part program may cause the machine tool to pass through a point in space which is occupied by a holding fixture. A safe zone or a protected zone can be defined by the machine operator by entering the location into memory of each clamping or holding fixture. Typically, the defined safe zone will be a three-dimensional space within which a clamping fixture or a chuck is contained. However, it is also possible to define a zone within which a tool is permitted to enter but not to exit, i.e., a zone may be defined as a no-exit zone. An example of a no-exit zone would be one in which it is desired to drill a hole through the center of a workpiece held in a chuck. In this instance, a drill bit would be permitted to enter through the center of the workpiece but would not be allowed to go beyond a certain depth or to deviate radially from the center. Thus, there would be defined a no-exit zone within a no-entry zone.

Robot arm movements must similarly be protected from hitting stationary objects. Since the arm movements are controlled by programs just as are machine tools, zones can be defined in the same manner as for such machine tools. More particularly, a tool held by an end effector or clamp on the robot arm can be treated as though it were a cutting tool in a lathe.

The establishment of safe or protective zones within a machining sphere of operation has been known in the prior art. In prior art controls of which we are aware, safe zones may be defined by the machine operator in a manner similar to the method used in this invention. However, in the prior art controls the tool position or any other point which is being monitored is monitored on a continuous basis and operation is only inhibited when the tool or other monitored point comes into contact with the safe zone. If the machine has any degree of overtravel, once a motion stop command has been given, the tool or monitored point may enter the safe zone before coming to a halt. The safe zone must, therefore, be defined to have certain overlapping dimensions of sufficient depth to avoid having the tool or monitored point come into contact with the protected device. Thus, the prior art controls must continuously monitor tool position in order to detect intersection with a safe zone and safe zones must be defined to have sufficient dimensions to avoid collisions which could be caused by mechanical overtravel.

It is an object of the present invention to provide an improved method of machine operation utilizing safe zone controls.

It is another object of the present invention to provide an improved machine operating system which avoids the need for continuous monitoring of position with respect to each defined safe zone.

It is still another object of the present invention to provide an improved machine operating system which permits safe zones to be defined without extra dimensions to compensate for machine overtravel.

SUMMARY OF THE INVENTION

In accordance with the present invention there is provided an improved method for monitoring the location of safe zones and for inhibiting the operation of a machine when relative motion between a tool and workpiece will result in tool contact with a safe zone. In our improved method of operation, each command block of a part program is first evaluated to determine whether or not it is a move command. If the command is determined to be a move command, the start and end points of the path of travel are calculated. The path of travel of the tool in moving between the start and end points is also determined. The start and end points of the move are then compared with the previously defined safe zones to determine whether the start point is within a no-entry zone or whether the end point is outside a no-exit zone. If either situation exists, the machine operation is inhibited. The path of travel of the machine tool is then compared against the known dimensions of each safe zone and any intersection of the predicted path of travel with the safe zone will result in inhibition of that command block of information. The present invention thus contemplates that for each command block of information, the predicted path of travel and its start and end points of the move will be computed and compared against known safe zones. If the path of travel intersects a zone, the part program will be stopped and machine tool operation inhibited. In this manner, the inventive method of operation eliminates the need to continuously monitor tool position and allows for very closely defined protective or safe zones around clamping devices or other components which might interfere with tool or tool holder movement.

DETAILED DESCRIPTION

Figure 1:
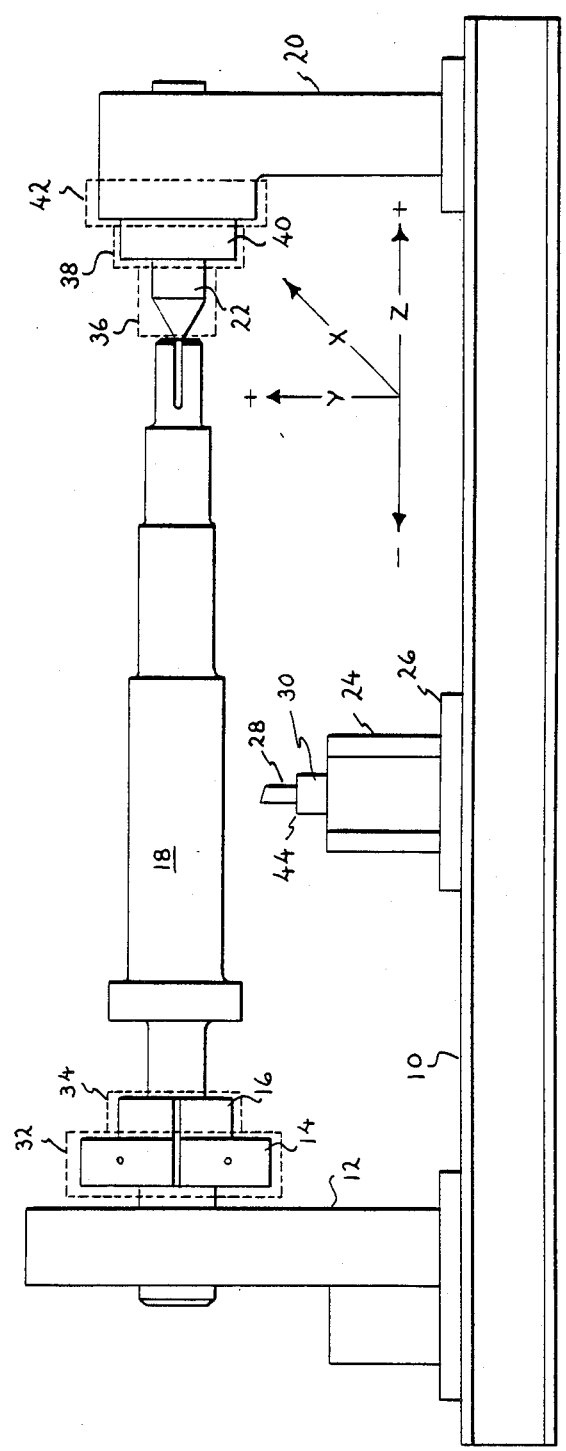
FIG. 1 is simplified drawing a machine tool for purposes of illustrating a method according to the invention.

Referring now to FIG. 1, there is shown a highly simplified view of a machine tool, in this case a lathe, which will illustrate the use of safe zones. The CNC, the driving motors and other required elements of an operating machine tool are not shown in this figure. The machine includes a bed 10 upon which is mounted a frame 12 supporting a workpiece holding mechanism or chuck 14. The chuck 14 includes jaws 16 which can be tightened upon a workpiece 18 to hold it in position and, in the case of the illustrated lathe, provide the connection to the driving motors which enables the workpiece to be rotated for machining. While one end of the workpiece 18 is held within the jaws 16, a second end is held against a tailstock 20 and pinned in place by a center 22 held in a center holder 40. The tailstock 20 is also attached to the machine bed 10. A tool holding mechanism 24 is also mounted on the machine tool bed 10. The tool holding mechanism 24 includes a base 26 which allows the mechanism 24 to move in parallel with the lengthwise axis of the workpiece 18 and also to move in a direction perpendicular to the workpiece 18. A cutting tool 28 and tool base 30 are mounted in the tool holding mechanism 24. The base 30 is connected to the mechanism 24 in such a manner that it can be raised and lowered so as to bring the cutting tool 28 into contact with the workpiece 18.

For purposes of this discussion, the axis of motion parallel to the lengthwise axis of the workpiece will be referred to as the Z axis, the vertical axis will be referred to as the Y axis and the axis moving in and out of the paper with respect to the viewer will be referred to as the X axis. It will be appreciated that as the tool holding mechanism 24 is driven in the Z axis toward the frame 12, it becomes possible for the tool 28 to come into contact with the chuck 14. Further, if the tool 28 is driven along the Y axis at the same time, it may also come into contact with the jaws 16 of chuck 14. Similarly, any move in the Z axis direction towards the frame 20 may also result in the tool 28 or tool holder 30 or mechanism 24 coming into contact with some portion of the tailstock 20. In order to prevent such collisions from occurring, a zone 32 is defined around the chuck 14. An additional zone 34 is also formed around the jaws 16. At the tailstock end of the machine, a zone 36 is defined around the center 22 and a zone 38 is defined around the center holder 40. An additional zone 42 is also defined about a portion of the tailstock 20. Since in a lathe of the type illustrated, the position of the tool 28 in the X axis is normally fixed, the zones need only be two dimensional for this application. Accordingly, the computation of interference points need only be done with respect to lines rather than planes. However, in a milling machine or robot arm operation, the zones would more likely be three-dimensional.

As noted previously, the present invention is particularly adapted for use with a computer numerical control (CNC) in which the positioning of the cutting tool 28 with respect to the workpiece 18 is defined by a part program operating within the CNC. As is well known, part programs are divided into command moves or work statements wherein each block of information within a part program defines a unidirectional movement of the machine cutting tool 28 with respect to the workpiece 18. However, there are certain moves, such as circular arcs which are performed by "canned cycles" which can be called by command blocks within the part program. In the present invention, when a command move is generated, the CNC determines whether that move will intersect any of the protected zones on the machine tool working area. In the illustrative example, the CNC will determine whether the machine tool 28 during a prescribed movement would intersect the zones 32, 34, 36, 38 and 42. If any of the zones would be intersected by the command move, the part program would be stopped and operation of the machine tool inhibited so that an operator could be alerted and take appropriate action.

Figure 2:
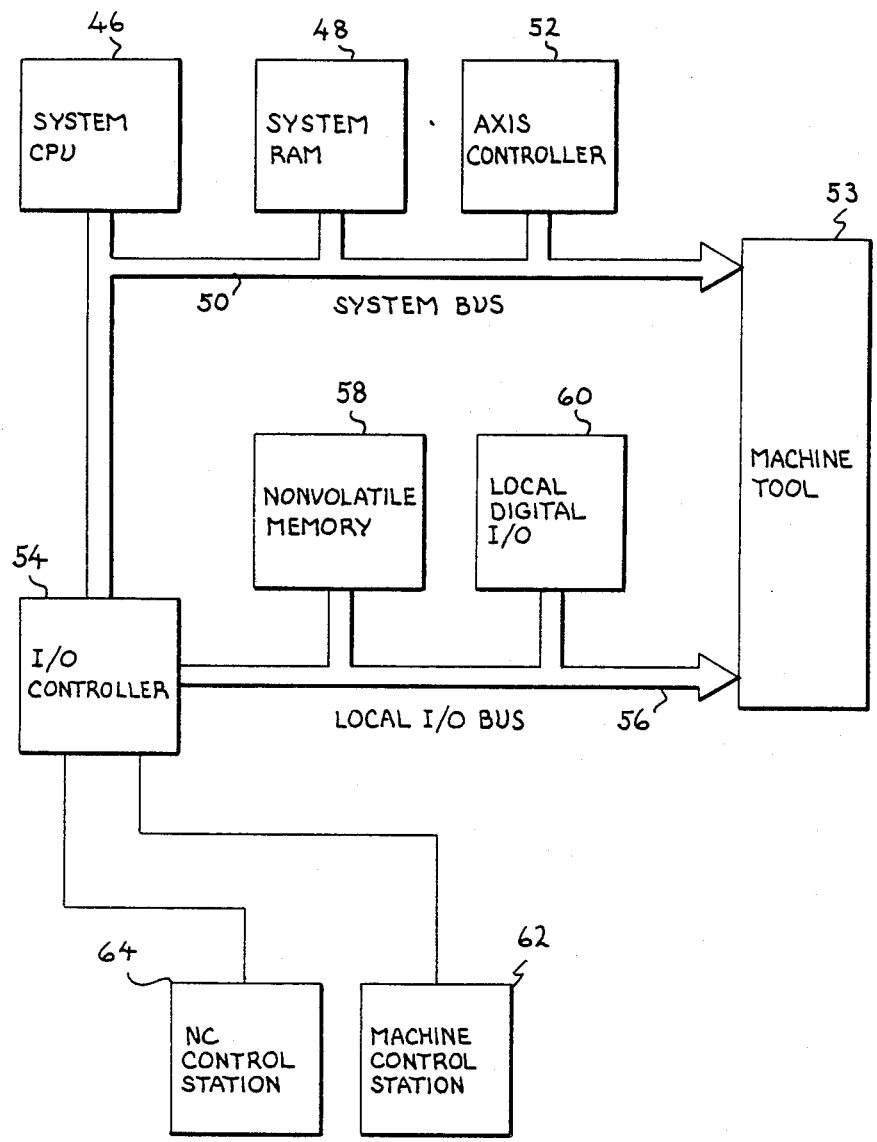
FIG. 2 is a block diagram of a computer numerical control of a type applicable for implementation of a method in accordance with the invention.

Although the cutting tool 28 may be of primary concern, it is also possible that a corner 44 of the tool base 30 might also come in contact with the chuck 14 or chuck jaws 16. For example, if the tool were moved into a position for cutting the reduced cross section 46 on the workpiece 18, it might be possible for the corner 44 to come into contact with the jaws 16. Consequently, the point 44 may be defined as an additional monitored point for which the CNC would also have to determine whether that point intersected any of the defined safe zones for any particular commanded move. Although the method of operating a machine tool system is applicable with any type of CNC, the implementation disclosed herein is particularly applicable for use with a Mark Century ® 2000 CNC available from General Electric Company. The Mark Century 2000 CNC is a microprocessor based control unit employing Intel 8086 and 8087 microprocessors. The hardware architecture for the Mark Century 2000 CNC is shown in FIG. 2. The system central processing unit (CPU) 46 performs processing operations for the system and contains the Intel 8086 and 8087 microprocessors. The system dynamic ram 48 (random access memory) contains read-write memory for the system and is coupled to the system CPU and other functional portions of the system through a system bus 50. An axis controller 52 connected to the bus 50 provides several control functions for each driven axis of a machine tool 53. The axis controller 52 contains it own microprocessor which serves as a front end processor to interface a coordinated group of axes to the system bus while other processors on the controller perform computations for the control axis.

An input-output (I/O) controller 54 coordinates system bus I/O operations and serves to connect the system bus to a local I/O bus 56. The local I/O bus 56 connects the system to a non-volatile memory 58 in which the part programs and all system data which must be preserved are stored. The local I/O bus 56 is also connected to a local digital I/O 60 which is functionally associated with a machine control station 62. The local digital I/O 60 generates digitized actuator control signals and monitors the status of contact inputs.

An NC control station 64 is also connected to the I/O controller 54. The NC control station 64 serves as a front panel to machine tool operators, part programmers and designers. The machine control station 62 is a control panel from which a machine tool operator can perform manual operations and control the execution of part programs.

The CNC illustrated in FIG. 2 operates under control of the system CPU 46 executing programs resident in the system ram 48. Part programs may be input from an external device such as a paper tape or cassette reader (not shown) through the I/O controller 54 or through a keyboard on the NC control station 64. Any part program which is input to the system is stored by the I/O controller 54 into nonvolatile memory 58. The system CPU 46 directs the execution of other part programs through the I/O controller 54 and the axis controller 52. Part programmed axis commands are executed through the axis controller 52 which is connected to the machine tool 53. The machine tool 53 contains axis feed drives which are under control of the axis controller 52. Non-axis commands (e.g., coolant on or off) are executed through the I/O controller 54, connected to the machine tool 53 through the local digital I/O bus 56. Commands entered with pushbuttons and controls on machine station 62 are communicated to the I/O controller 54 and finally to the machine tool 53 through either the axis controller 52 or the local digital I/O bus 56.

As is well known, a CNC as with most other computer control systems has evolved from a hardwired system into essentially a computer architecture which is customized into a firmware control system through the use of software. Computer programs, i.e., software, provide the method for reconfiguring each of these computer systems into a system equivalent to those earlier hardwired systems. The method disclosed in this application is thus configured in the form of a computer program which forces the hardware system illustrated in FIG. 2 to operate in a particular fashion in order to implement the improved method.

Figure 3:
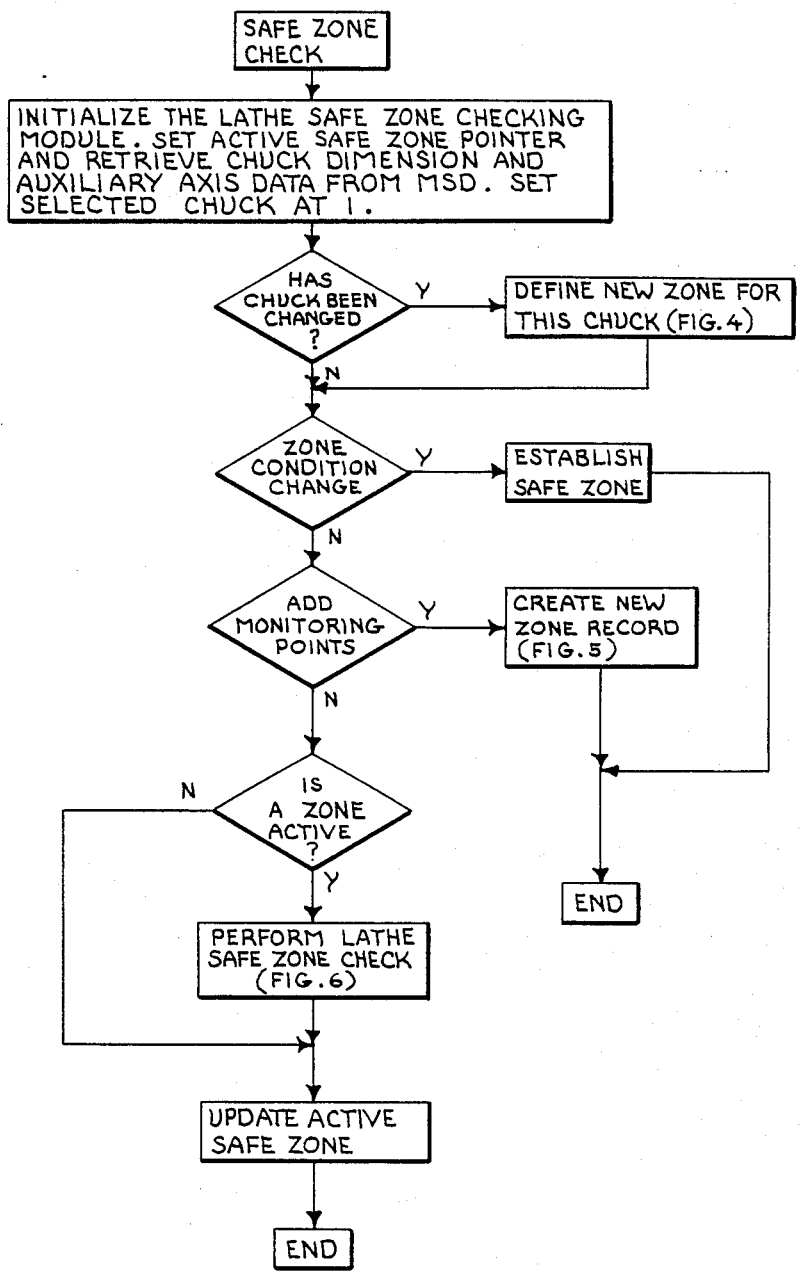
FIG. 3 is a flow chart illustrating broadly the method of the invention as applied to a machine tool of the type shown in FIG. 1.

Referring now to FIG. 3, there is shown a flow chart illustrating broadly the improved method of operation as applied to a lathe of the type illustrated in FIG. 1. Safe zone checking is initiated each time that a block of data is processed by the CNC system. Before any move is initiated, the program verifies that no zones will be violated by the move. Before discussing the particular method illustrated in FIG. 3, it should be noted that the subject of safe or protective zones can be divided into three distinct areas:

(1) Bounded areas from which a tool or an optionally defined additional monitoring point may not depart.
(2) Forbidden areas into which a tool or an optionally defined additional monitoring point may not enter.
(3) Interference zones for four or more axes to prevent collisions between multiple turrets, tailstocks, chuck faces or other machine elements.

The inventive method utilized in the present invention prevents a programmed or internally generated move from becoming active if it is determined on a predictive basis that it would exceed the bounds of a defined safe zone. It should be noted that the actual location of a tool tip must also be determined before the tool tip path can be located. The tool tip position will be modified by tool offsets, tool nose radius compensation, presets, offsets and reference zero presets.

Referring again to FIG. 3, the safe zone checking module is called for each block of information within a part program and also for each manual move generated from the control station 62. A block of information may define either a move, a zone definition change or some other instruction. If the information block is merely a definition CHANGE IN A ZONE, the safe zone checking module is only called upon to establish the new desired safe zone definitions. If the command block is for a move, then the module must determine whether that move will intersect a safe zone which was previously established. Since the primary interference concern in a lathe is with the chuck, the first step is to determine the chuck dimensions. The "HAS CHUCK BEEN CHANGED" step determines if the chuck dimensions have been changed and, if so, branches to DEFINE NEW ZONE. In the block identified as ZONE CONDITION CHANGE, the program determines whether the command block is a move block or a definition change. If it is merely a definition change, the program will recognize a condition change and branch to establish the new safe zone (ESTABLISH SAFE ZONE) followed by an exit of the program. If the command block is not a zone condition change, then it could be a move command and the method then requires a check to determine whether there are additional monitoring points (ADD MONITORING POINTS). If there are additional monitoring points, then the command block is a definitional block rather than a move block and the program will then branch to CREATE A NEW ZONE RECORD in which step the new monitoring points are identified. If additional monitoring points are not being added, then the command block must be a move block and the next step is to determine whether any monitored zones are active (IS A ZONE ACTIVE) since it is possible to disable safe zones via part program input. If any zone is active, the program performs a safe zone check (PERFORM LATHE SAFE ZONE CHECK) and calculates whether the move will intersect a safe zone. After all checks have been completed, the program updates all the active safe zones and exits. If no zones are active, updates are unnecessary and the data is merely "rolled" so as to be available for the next command block.

Figure 4:
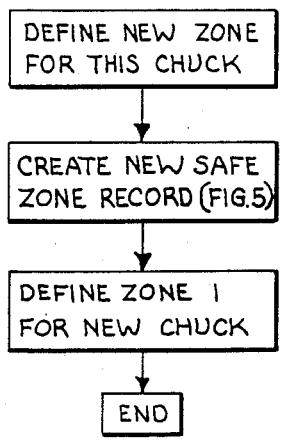
FIGS. 4-9 are flow charts expanding upon the flow chart of FIG. 3.
Figure 5:
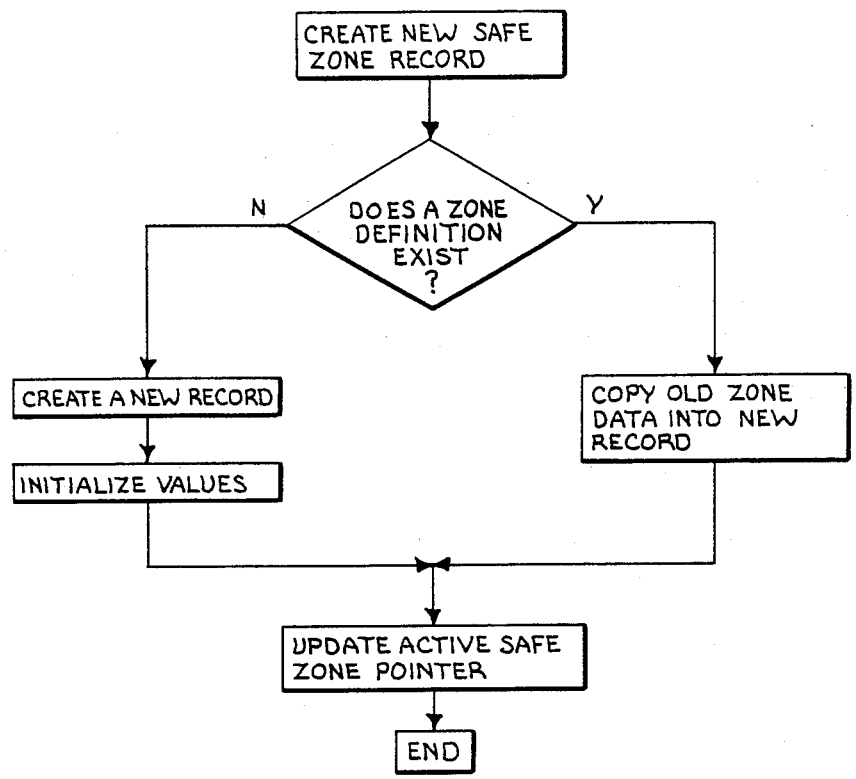

FIGS. 4 through 8 expand upon the functions identified in the flow chart of FIG. 3. Referring now to FIG. 4 the step entitled DEFINE NEW ZONE FOR THIS CHUCK is shown in greater detail. As is illustrated, if a new zone definition is required, then a new safe zone record must be created in memory (CREATE NEW SAFE ZONE RECORD). The creation of a new safe zone record will be further described in FIG. 5. Once a safe zone record has been established, the new chuck safe zone is moved into the zone one definition (DEFINE ZONE 1 FOR NEW CHUCK). Referring to FIG. 5, the sub-steps necessary to CREATE NEW SAFE ZONE RECORD are illustrated. The program must first determine whether or not a zone definition already exists for the required safe zone. If a zone definition does exist, the zone data is copied into a new record location. The program then moves the pointer to the active safe zone location. If the zone definition does not exist, a new record must be created and values initialized either in accordance with the information programmed from the NC control station 64 or from information supplied with the part program. Once the new record is created, the pointer is updated to point to the active safe zone information.

Figure 6:
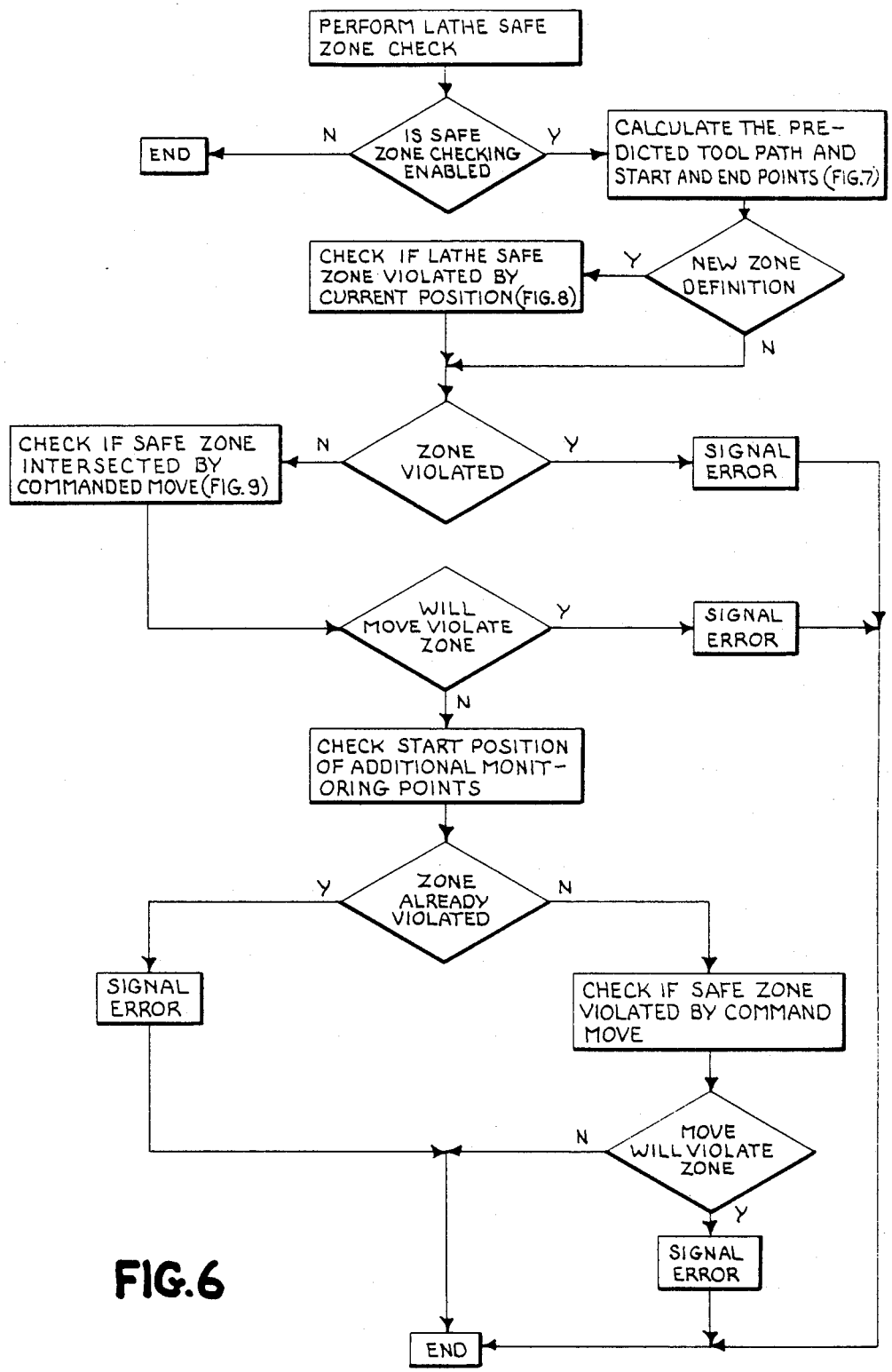

The process of actually checking the safe zone to determine whether an intersection will occur is illustrated in FIG. 6. The safe zone check determines first whether safe zone checking has been enabled. If checking has not been enabled, the program immediately exits. Otherwise, the program evaluates the commanded move by calculating the predicted tool path and the start and end points of the move for the tool tip. Once the start and end points and predicted tool path are calculated, the program next checks if a new zone definition exists. If a new zone has been defined, there is a possibility that the start point of the move may already violate a zone. Such may occur, for example, on initial startup of the system. Thus, the programmed method checks a safe zone violation at the current tool position. If a zone is violated, an error signal is generated and the operation of the machine tool is inhibited. If no new zone definition occurs, the current position check is skipped and the program checks to see if a zone would be intersected by the commanded move. If the move will violate a zone, an error is signalled and machine operation is inhibited. If the commanded move does not violate a zone, the program next determines whether there are additional monitoring points other than the tool tip which must be checked. The additional monitoring points are checked in essentially the same manner as the tool tip. The start point and intersection point with the defined safe zones are checked to determine if they will violate a safe zone. If any checks result in a violation of a safe zone, an error signal is generated and operation of the machine tool is inhibited. If no violations are detected, the program exits and allows the commanded move to be processed.

Figure 7:
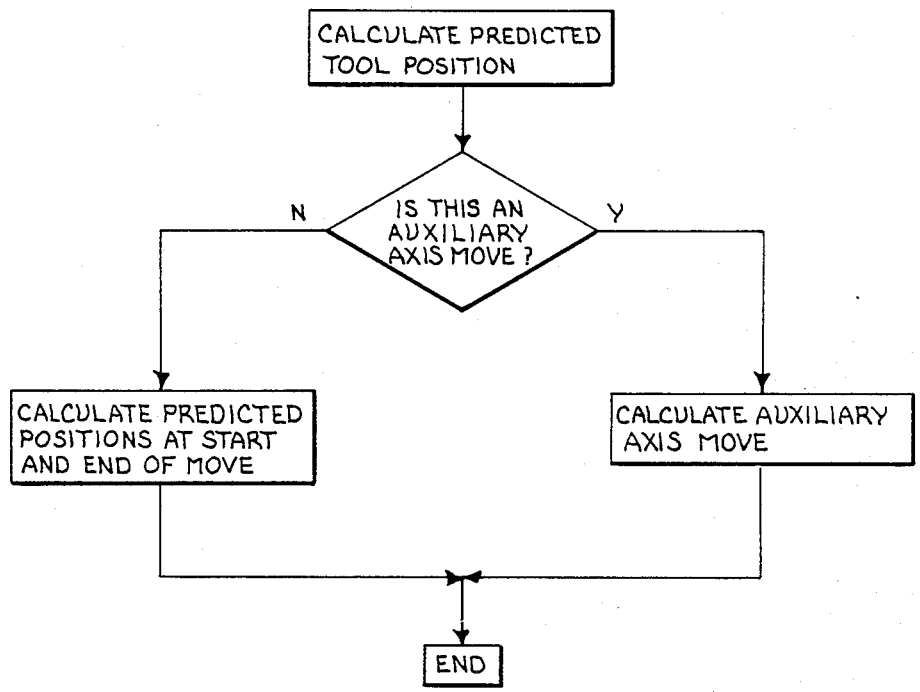

A flow chart for the step entitled CALCULATE PREDICTED TOOL POSITION is shown in FIG. 7. Referring now to that figure, it can be seen that the first check is to determine whether the commanded move is an auxilliary or primary axis move. For purposes of this discussion, an auxiliary axis is defined as a non-contouring axis and non-spindle axis, e.g., it may be a tool changer which is rotating or a table rotating to bring a workpiece into position. For an auxiliary axis move, the programed method performs essentially the same safe zone checks as for a primary axis. For a primary axis move, the predicted position at the start and the end of the move are determined. The exact details of the calculations are shown in detail in the program attached hereto as a microfiche appendix.

Figure 8:
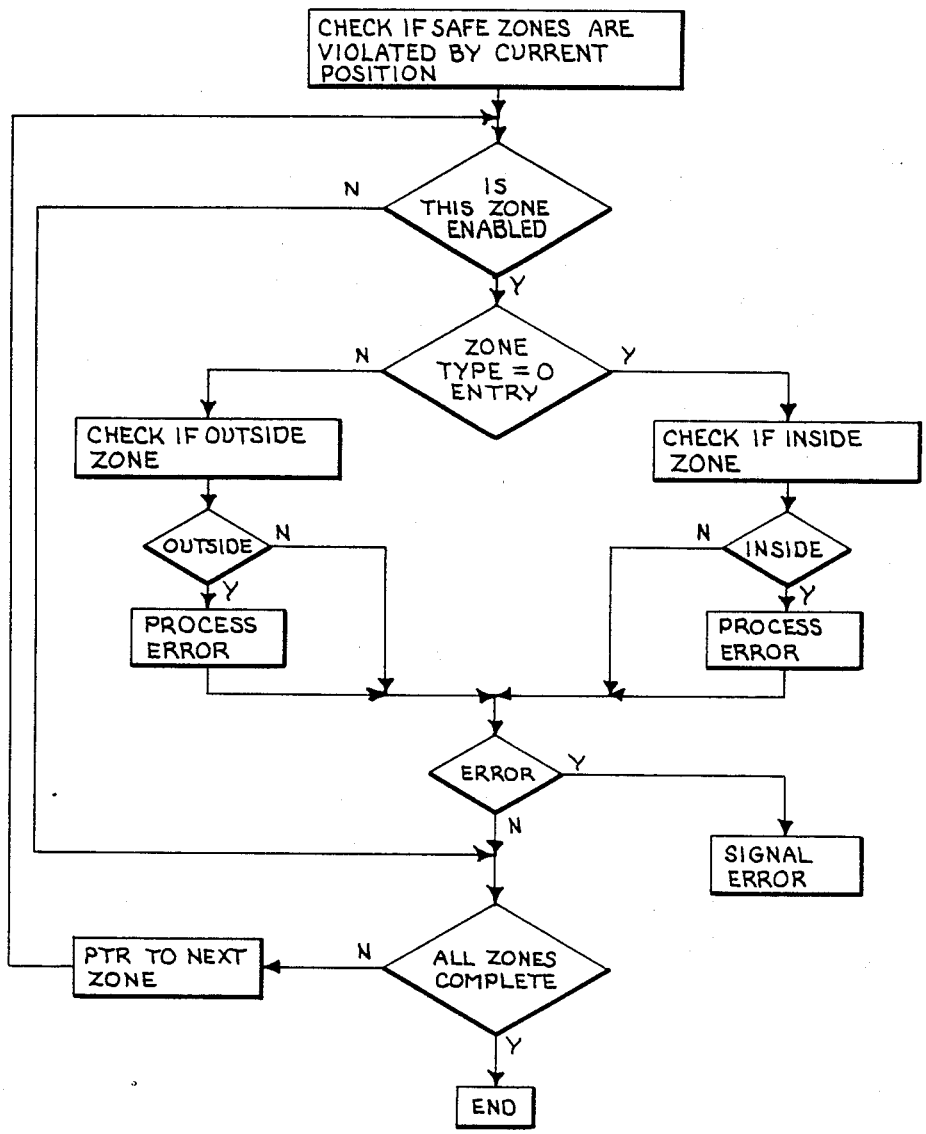

Referring now to FIG. 8, there is shown an expanded flow chart for the step CHECK IF SAFE ZONES ARE VIOLATED BY CURRENT POSITION of a monitored point. Note again that the first check for any safe zone is to determine whether or not that safe zone has been enabled for this particular move. If the safe zone is enabled, the calculations are performed. Otherwise, that zone is skipped and the next zone to be checked is processed. In zone checking, the programmed method determines whether the zone type is a no-exit or a no-entry zone. If the zone type is a no-entry zone, then a calculation must be performed to determine if the actual position at the start point of the move is inside the safe zone. If the start point is determined to be inside the zone, then an error signal is generated and the move is inhibited. If the start point is not inside a zone, then the program checks to determine if all zones have been completed and, if so, exits to the main program. If the zone type is determined to be a no-exit type of zone, then the checking will determine if the start point is outside the zone and therefore already in violation of the safe zone dimensions.

Figure 9:
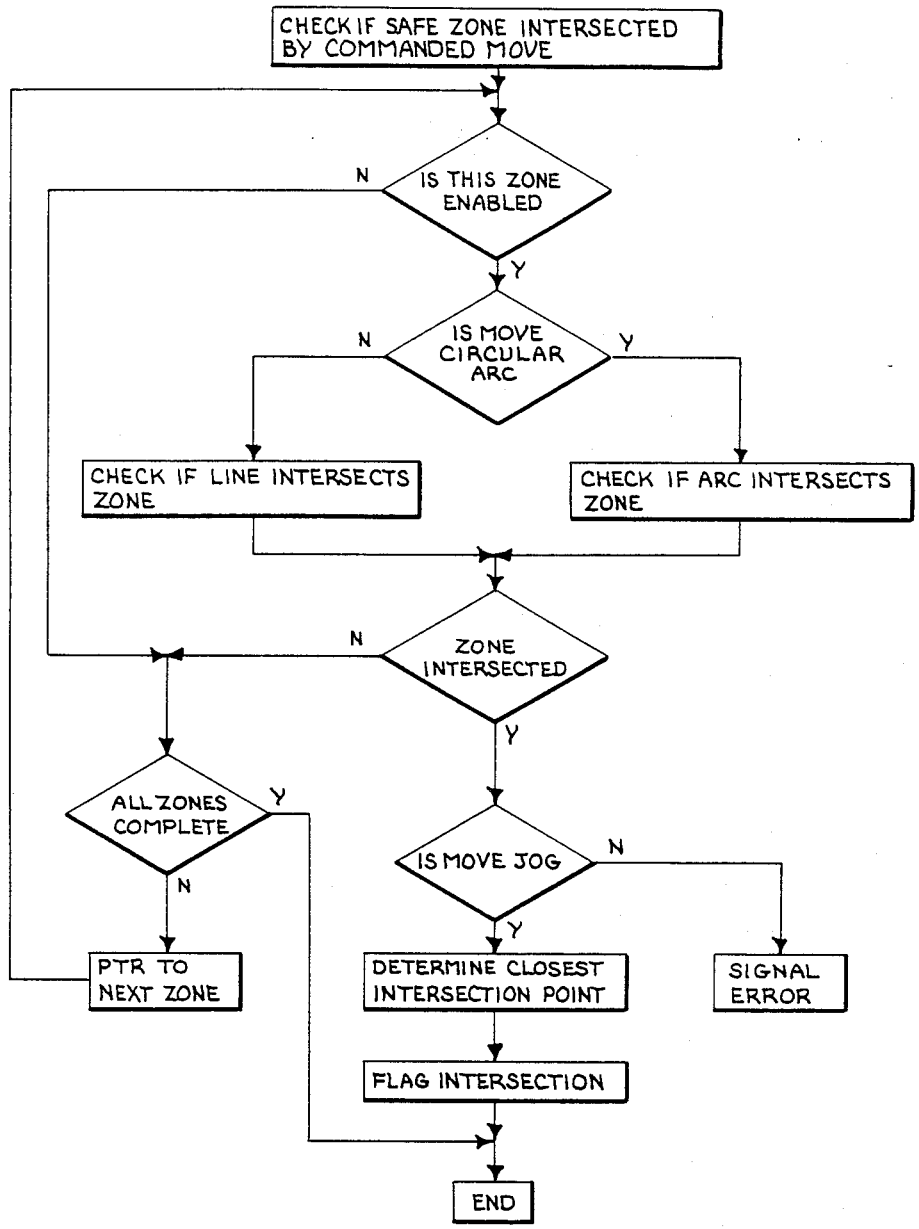

FIG. 9 illustrates the method for determining if the safe zone is intersected by a commanded move. Again the first check determines whether or not the particular zone being checked is enabled at this time. Assuming that the zone has been enabled, the potential relative movement between the tool and workpiece can be a circular arc or a linear move. If a circular arc is programmed, a unique calculation is required to determine if the arc intersects the zone. A different calculation is required to determine if a linear move, i.e., straight line, will intersect the zone. Both of these calculations are disclosed in detail in the microfiche appendix. If it is determined that a zone is intersected by a move, the programmed method evaluates whether or not the move is a JOG move, i.e., a manually forced move. Since it may be desirable to advance a tool to a location adjacent a safe zone, a JOG move is permitted to continue up to the point at which it actually intersects a safe zone. In processing the JOG move, however, the program actually calculates the closest intersection point to the JOG move and allows an operator to JOG only to that closest point, i.e., rather than permit the commanded move to be processed, the distance to the closest intersection point is substituted for the commanded move distance so that the actual move is truncated at the zone intersection point.

In order to terminate JOG moves when a limit is encountered, the direction of the JOG in each axis is determined and a maximum distance that each axis may travel without exceeding the appropriate limit is placed in a distance-to-go register. The result is that motion in a second axis may continue even if the first axis has reached its limit of travel.

Although the detailed description has been set forth with specific reference to a lathe, it will be apparent that the inventive method is equally applicable to a milling machine or a robot. In these latter applications, safe zones would more likely be defined as three-dimensional spaces thereby necessitating calculation of intersection points between a line and a plane. However, such calculations are well known and can be obtained from many geometry and calculus textbooks. It is therefore intended that the invention be given the full breadth and scope of the appended claims.

We claim:

1. A method for determining interference between relatively moveable components of a computer controlled industrial machine, the machine being automatically controlled by a computer program to cause relative movement between a tool on the machine and a workpiece, the computer program providing sequential blocks of data, selected ones of the data blocks comprising incremental positioning commands for causing the tool to move with respect to the workpiece, said method comprising the steps of:
  (a) defining a protected zone within a sphere of operation of the machine;
  (b) determining for each of the positioning commands whether relative movement between the tool and workpiece will cause the tool to intersect a boundary of the protected zone; and (c) inhibiting operation of the machine for any of the positioning commands having a predicted path of movement intersecting the protected zone.

2. A method in accordance with claim 1 and including the additional steps of:
   (d) determining a start point for each of the positioning commands; and
   (e) inhibiting operation of the machine when the start point is within the protected zone.

3. A method in accordance with claim 1 including the additional steps of:
   (a) determining whether the protected zone is a no-entry or a no-exit type of zone;
   (b) computing for each of the positioning commands a start and an end point for the corresponding move;
   (c) inhibiting operation of the machine when the start point is within a no-entry type of zone; and
   (d) inhibiting operation of the machine tool when the end point is outside a no-exit type of zone.

4. A method in accordance with claim 1 or 3 wherein each of a plurality of zones is separately identified within the sphere of operation of the machine, each of said steps being repeated for each of said zones.

5. A method in accordance with claim 1 wherein the machine includes apparatus for manually providing positioning commands for forcing relative movement of the tool in a plurality of axes, comprising the additional steps of:
   (a) determining for each of the manual positioning commands a predicted path of relative tool movement and the closest intersection point between the tool and a protected zone in the predicted path;
   (b) calculating the distance between the cutting tool and the intersection point in each axis of relative movement of the tool; and
   (c) inhibiting response of the machine to the manual positioning commands in each axis of relative movement independently of movement in any other axis when the actual distance moved in that axis is equal to the calculated distance.

* * * * *